Aug. 23, 1960  D. T. N. WILLIAMSON ET AL  2,949,742
SERVO-CONTROLLED DRIVES
Filed Nov. 20, 1958  4 Sheets-Sheet 1

David Theodore Nelson Williamson
and Harry Ogden, Inventors

Attorneys for Applicants

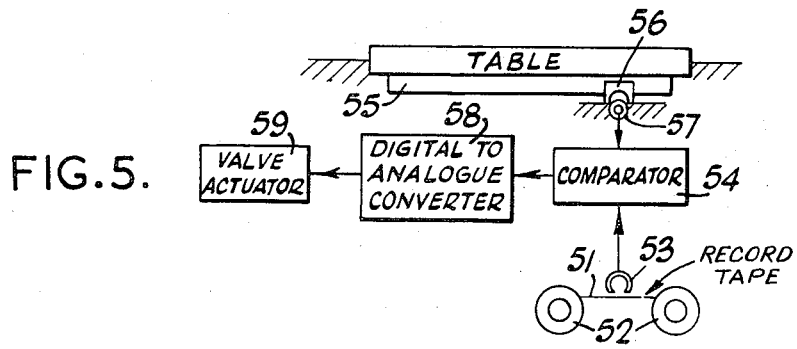
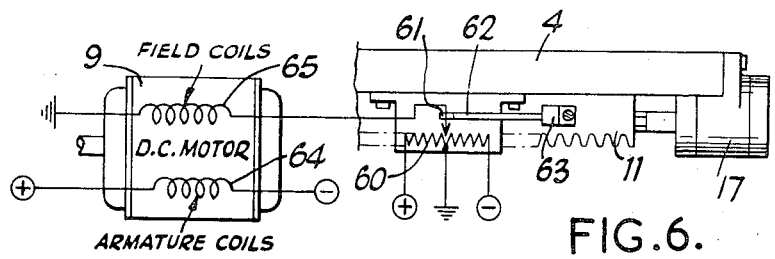
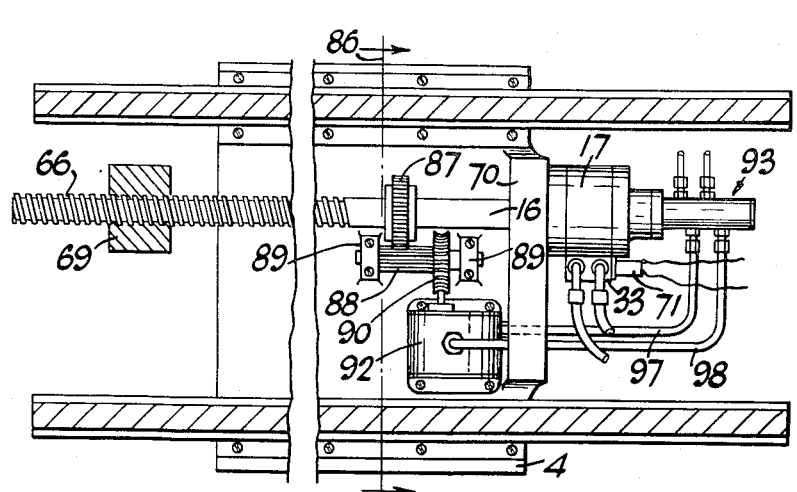

Aug. 23, 1960  D. T. N. WILLIAMSON ET AL  2,949,742
SERVO-CONTROLLED DRIVES
Filed Nov. 20, 1958  4 Sheets-Sheet 4

David Theodore Nelson Williamson
and Harry Ogden
Attorneys for Applicants

United States Patent Office 2,949,742
Patented Aug. 23, 1960

2,949,742

SERVO-CONTROLLED DRIVES

David T. N. Williamson, Priorswood, Polton, Midlothian, and Harry Ogden, Edinburgh, Scotland, assignors to National Research Development Corporation, London, England, a corporation of Great Britain Filed Nov. 20, 1958, Ser. No. 775,200

Claims priority, application Great Britain Dec. 2, 1957

7 Claims. (Cl. 60—97)

This invention relates to apparatus for driving a first object along a predetermined path in relation to a second object and is particularly applicable to the propulsion of the slides of machines tools along their slideways though the invention is not confined to such applications.

According to the invention there is provided apparatus for driving a first object along a predetermined path in relation to a second object comprising two driving mechanisms coupled together and to the first object and the second object in such a manner that movements of the first object relative to the second object along the said path are dependent upon the algebraic sum of the individual driving actions of the two driving mechanisms, the first driving mechanism being capable of a relatively high driving acceleration over only a relatively short range of driving action and the second driving mechanism being capable of a relatively long range of driving action but being arranged to provide only a relatively low driving acceleration, means, responsive to a signal representing the motion required of the first object in relation to the second object along the said path, for actuating the first driving mechanism and means for controlling the second driving mechanism, such means having two co-operating members one coupled to one part and the other coupled to the other part of two parts of the first driving mechanism which execute relative movement to provide the driving action of the first driving mechanism, the said members co-operating to increase the driving action of the second driving mechanism as the said two parts of the first driving mechanism move away from a predetermined relative position intermediate between the relative positions occupied by such parts when the first driving mechanism is at the ends of its driving range and to reduce the driving action of the second driving mechanism as the said two parts move towards the said predetermined relative position.

According to the invention there is further provided apparatus for driving a first object in relation to a second object along a predetermined path, having a first driving mechanism comprising a hydraulic piston and cylinder arrangement and a second driving mechanism comprising a rotary driving motor coupled to a device for transforming rotary motion derived from the said motor, into motion in the direction of the said path, the two driving mechanisms being coupled together and to the first object and the second object so that relative movement between the two objects along the said path is dependent upon the algebraic sum of the driving actions of the two driving mechanisms, the hydraulic piston and cylinder arrangement having a short stroke and being controlled by a high performance hydraulic valve, the second driving mechanism having a range of driving action which is long in relation to the said stroke but being arranged to provide a driving acceleration which is low in relation to that of the hydraulic piston and cylinder arrangement, a closed servo loop for controlling the relative motion between the two objects in the direction of the said path comprising means for receiving signals characteristic of desired relative motion between the said objects along the said path, means for receiving signals characteristic of relative motions taking place between the said objects along the said path, means for comparing the said signals so received and continuously generating an error signal representing the difference between the said signals, an actuator for the hydraulic valve, means for continuously operating the actuator in accordance with the instantaneous value of the error signal, co-operating members coupled respectively to the piston and cylinder of the said hydraulic arrangement, means for energising the motor of the second driving mechanism in such a sense as to supplement the driving action of the hydraulic arrangement such means operating to energise the second driving mechanism in progressively increasing degree as the piston approaches an end of its stroke within the cylinder and progressively to decrease the degree of energisation of the second driving mechanism as the said piston recedes from an end of its stroke within the cylinder towards zero energisation at a predetermined mid point of the stroke of the piston in the cylinder.

The invention will be more readily understood from the following description of certain embodiments thereof illustrated in the accompanying drawings in which:

Figure 5 is a schematic diagram of a servo control system for use with the invention;

Figure 6 is a diagram of a second motor control circuit for use with the invention;

Figure 7 is an inverted and sectioned plan view of a second embodiment of the invention;

Figure 1:
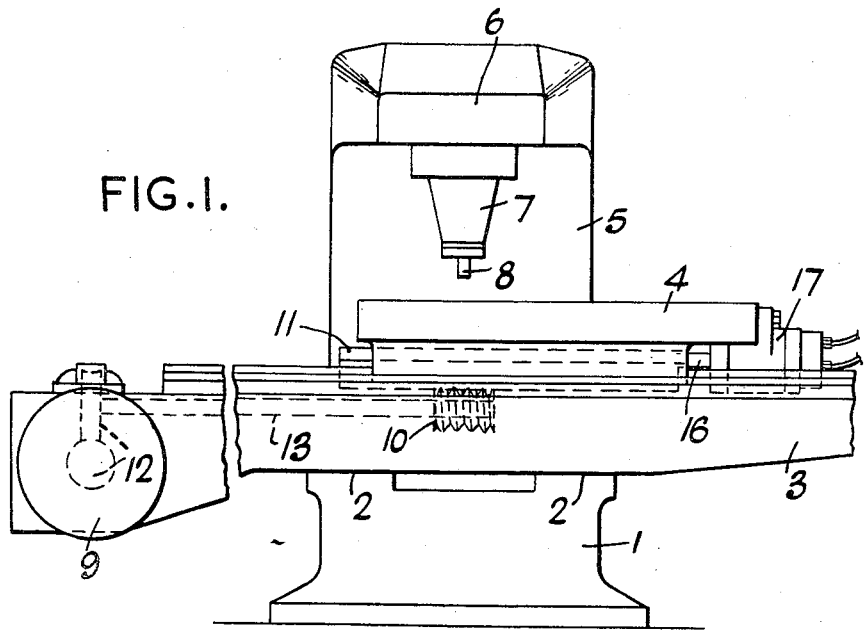
Figure 1 is an elevation of a first embodiment of the invention.

For convenience of description the first driving mechanism will hereinafter be referred to as "the quick drive" and the second driving mechanism will be hereinafter referred to as "the slow drive" but these terms should not be considered as in any way defining or limiting the properties of the two said mechanisms.

The invention finds its principal uses in systems where the relative positions, velocity or acceleration (or any combination of the three) of or between two objects, along a predetermined path, is required to be under control of a command signal of which a characteristic is variable according to the relative position, velocity or acceleration (or combination of the three) required of the two objects.

Systems of this type, commonly called "servo systems," present the difficulty that a driving mechanism having a quick response to a change of the command signal will tend to have a small range of driving action and conversely a driving mechanism having a large range of driving action will tend to have a slow response to a change of the command signal.

This may be illustrated by the following examples:

A hydraulic piston and cylinder under the control of a well designed valve can respond extremely quickly to a sudden change in a command signal applied to an actuator controlling the valve but if the cylinder is long this advantage is lost due to the compliance or compression of the hydraulic fluid contained in the cylinder. The compressibility of this volume of fluid reduces the stiffness of the system so that the resonant frequency of the inertia load is lowered.

The stiffness of a long hydraulic cylinder can be increased by increasing the diameter of the bore but this in turn increases the volume of the fluid to be moved which requires a large valve with a slower response.

The quick response of a hydraulic piston and cylinder arrangement is therefore only obtainable when the stroke is short.

To provide a relatively large movement between the two objects' various mechanisms, many of which involve rotating elements, are available. An example of the latter is the well known lead screw and nut, one element being rotated by a rotary motor. Another example is a rack and worm. These mechanisms can be designed to provide great stiffness combined with a long stroke but it is correspondingly difficult to procure quick response without complication and expense. For instance, if the rotating element is driven by an electric motor, the armature cannot be rapidly accelerated without the application of considerable power. This difficulty becomes more acute the heavier the loads encountered.

A long hydraulic piston and cylinder combination is another instance of a driving mechanism suitable for providing relatively large movement between the two objects but it has already been explained that such a drive lacks stiffness unless it has a large diameter.

The invention combines the virtues of both types of driving mechanism and avoids their limitations A practical embodiment of the invention will now be described in relation to Figures 1 to 9 of the accompanying drawings.

Figure 1 is an elevation of a milling machine incorporating the invention.

The machine has a main casting 1 providing a horizontal platform 2 supporting slideways 3 upon which a work table 4 may ride from right to left and vice versa, as shown in the figure. Behind the slideways 3, a vertical pillar 5 fixed to main casting 1 supports a beam 6 overhanging the work table 4 and beam 6 has on its underside slideways not visible in the drawing, upon which rides a vertical tool spindle mounting 7 which is capable of horizontal movement on the slideways of the beam 6 in a direction normal to the plane of the paper. The slideways 3 and the slideways on the beam 6 permit relative movement between a tool carried on the spindle 8 and a work piece fixed to work table 4, along two axes at right angles to one another.

The work table 4 is moved along slideways 3 by means of a motor 9 driving a worm 10 (shown in dotted lines in Figure 1) which co-operates with a rack 11 (shown mainly in dotted lines in Figure 1). Motor 9 is coupled to worm 10 via a worm and worm wheel gear train 12 and shaft 13 (shown in dotted lines in Figure 1). Shaft 13 is coupled to worm 10 by gearing 14 not shown in Figure 1 but visible in Figure 2.

Rack 11 rides in guides 15 in the underside of work table 4 (visible in Figure 3) and is coupled to the work table via the piston rod 16 of a hydraulic piston and cylinder unit 17 of which is bolted to work table 4.

Figure 3:
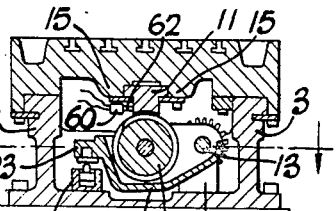
Figure 3 is a cross sectional side elevation of the said first embodiment.
Figure 2:
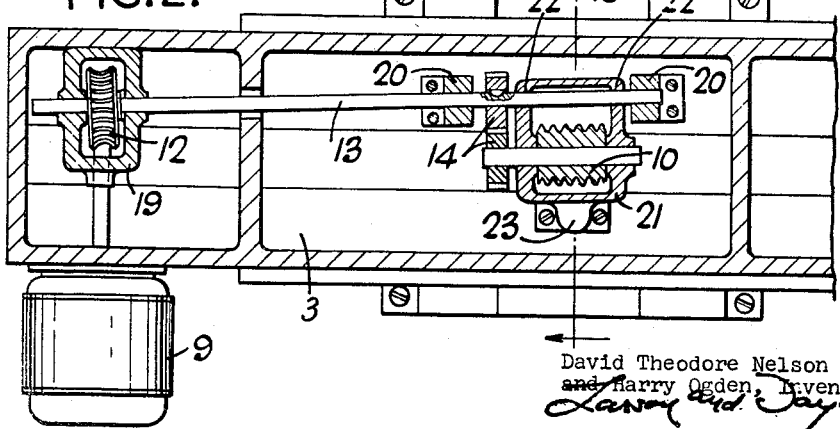
Figure 2 is a sectioned plan of the said first embodiment.

Figure 2 shows the milling machine in plan, sectioned in a horizontal plane running through the centre of worm 10. Figure 3 is a vertical section of the milling machine along line 18, looking in the direction of the arrows.

Shaft 13 is supported at one end by bearings in a housing 19, fixed rigidly to slideways 3, which accommodates the gear train 12. At its other end shaft 13 is supported in bearings 20 secured to the floor of the structure of slideways 3. Worm 10 is journalled for rotation in a cradle 21 and this cradle is capable of rotation bodily about the axis of shaft 13 which passes through bearing bushes 22 in cradle 21 which provide a pivot for the latter. Special precautions are taken to prevent endwise movement of shaft 13, worm 10 and cradle 21. These precautions, which are omitted to simplify the drawing, may take the form of conventional thrust bearings or may include a thrust bearing loaded by a hydraulic thrust arrangement. Cradle 21 has a lug 23 on the side remote from shaft 13 which rests on a hydraulic jack unit 24. Jack unit 24 is supplied with hydraulic fluid at a suitable pressure and forces the lug 23 upwards so that cradle 21 is urged to rotate about shaft 13 clockwise in relation to Figure 3 whereby worm 10 is forced upwards into engagement with rack 11 for the elimination of backlash.

Figure 4:
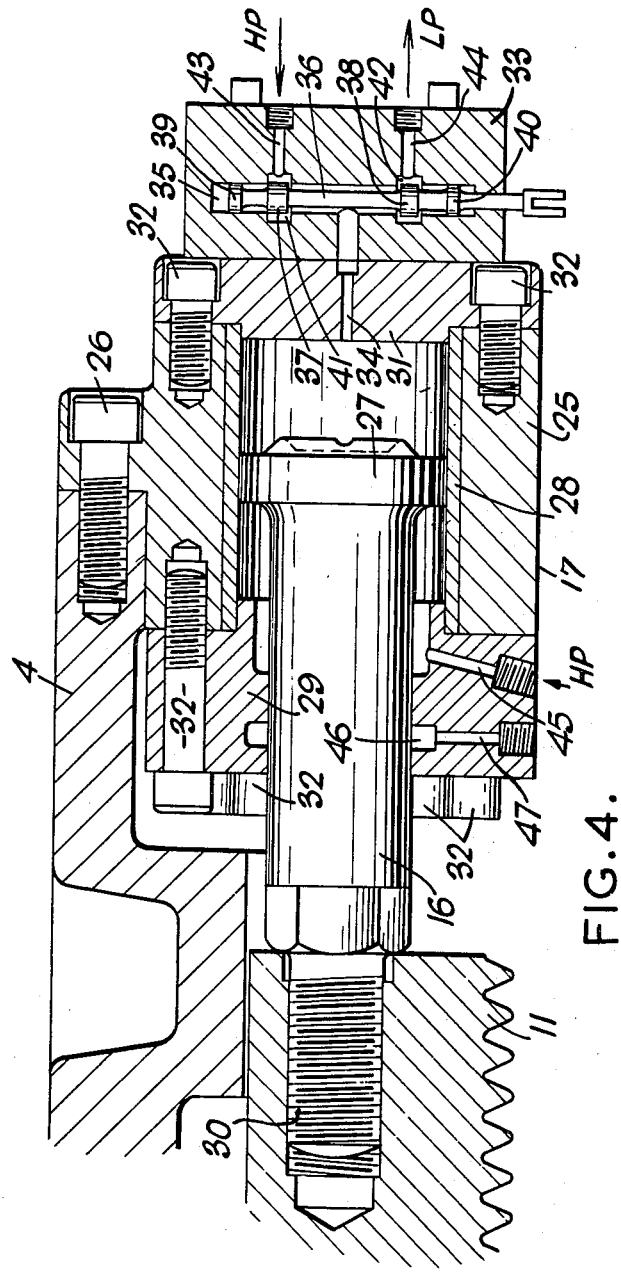
Figure 4 is a cross section to an enlarged scale of a part of the said first embodiment.

Figure 4 shows the hydraulic piston and cylinder combination 17 in section to an enlarged scale.

A cylinder body 25 is secured to the end of work table 4 by means of bolts such as bolt 26. A piston 27 slides in the bore liner 28 and is coupled to rack 11 by piston rod 16, which passes through a glanded cylinder end 29 by means of the screwthreaded extension 30. The other end of the cylinder is closed by a cylinder end 31, both cylinder ends being secured to the cylinder body 25 by means of bolts such as 32. The side of the cylinder to the right of piston 27, as seen in Figure 4 communicates with a hydraulic valve 33 via a port 34 in cylinder end 31.

Valve 33 has a bore 35 in which rides a spool 36 having two controlling lands 37 and 38 and two sealing lands 39 and 40. The lands 37 and 38 co-operate with annular ports 41 and 42 grooved out of the surface of bore 35 and communicating via supply ports 43 and 44 with unions (not shown) for the attachment of pipes leading to the high pressure and low pressure sides respectively of a hydraulic pressure supply system. The controlling lands 37 and 38 are dimensioned so that, when the spool is in the central position they do not completely isolate ports 41 and 42 from one another whereby there is a small flow of hydraulic fluid between supply ports 43 and 44. This arrangement is commonly referred to as "underlap" and makes for stable operation of the valve at small openings.

The side of the cylinder to the left of piston 27, as seen in Figure 4 communicates via a port 45 in cylinder end 29, with a union (not shown) for attachment of a pipe leading to the high pressure side of the hydraulic pressure supply system. The full pressure of the said system is therefore constantly applied to the left hand face of piston 27 but over an effective area which is reduced by the cross sectional area of piston rod 16. The pressure on the other side of piston 27 operates upon its full area however and is thus able to overcome the pressure on the left of piston 27 and force the latter to the left when the valve 33 is operated in the appropriate sense (i.e. upwards as seen in Figure 4). Conversely, when the valve 33 is operated in the opposite sense the right hand side of piston 27 is acted upon by the low pressure of the hydraulic system, which is overcome by the high pressure to the left of the piston even though it works upon a smaller effective area of piston surface.

A groove surrounds the outer end of piston rod 16 and is in communication via port 47 with a union (not shown) for attachment to the low pressure side of the hydraulic supply system, whereby oil leaking along the piston rod is scavenged.

Spool 36 is operated axially by an actuator which, for the sake of simplicity, is omitted from the drawing. This actuator is of a type responsive to command signals characteristic of movements required to be made by work table 4 along slideways 3.

In operation, the command signals produce movement of piston 27 which causes corresponding movements of work table 4, along slideways 3, in relation to rack 11, which, when motor 9 is at rest, is locked against axial movement by worm 10, the slant angle of which is such as to make the rack and worm combination virtually irreversible in the sense that loads applied to the rack 11 cannot rotate the worm 10.

Figure 6 shows a method for controlling motor 9. A rheostat 60 is fixed to the underside of the work table 4 and the slider 61 is coupled by a push rod 62 and a fixing bracket 63 to the rack 11. Motor 9 is a direct current motor with its armature windings 64 connected to the positive and negative terminals of a source of direct current. Rheostat 60 has its outer ends connected to the same terminals and its centre point earthed. The field windings 65 of the motor are connected between the rheostat slider 61 and earth. As soon as piston 27 moves off-centre, a voltage, varying in polarity according to the direction of movement, is applied to the field windings 65 and the motor starts. The power applied to the motor increases as the piston 27 moves further off-centre. With this arrangement motor 9 is energised progressively as the piston 27 moves from the central position and as the speed of the slow drive is proportional to the displacement of piston 27 the slow drive will approach closely to the average speed required on the part of the work table with a minimum of hunting.

For this to be effective it is in general necessary for the signal applied to the actuator for valve 33 to be subject to a feed-back servo system. An example of such a system is schematically illustrated in Figure 5. Figure 5 shows a record tape 51, for instance a magnetic record tape, carrying signals characteristic of the motions required to be executed by work table 4. Tape 51 is carried on spools 52 and passed by conventional magnetic record play-back methods over a reading head 53. The reproduced command signals pass to a comparator 54 which has another input from apparatus which originates signals characteristic of motions made good from time to time by work table 4 along slideways 3. Figure 5 illustrates one arrangement of this type in which an elongated optical diffraction grating 55 is attached to and moves with the worktable and a smaller grating 56 is anchored to the slideways, the two gratings being so placed and aligned that the small grating is narrowly separated from and overlies some part of the large grating in all positions of the work table along its slideways. The directions of the rulings of the two gratings are relatively inclined at a small angle so that alternate dark and light bands (so-called "moiré fringes") are seen when looking through the two superimposed gratings at a light source. These bands are approximately normal to the direction of the lines of the two gratings and move in the direction of their breadth when the small grating moves along the large grating on movement of the work table along its slideways. When an optical slit, parallel to the longitudinal axes of the bands, is introduced into the light path, a photo-electric cell such as that indicated at 57 in Figure 5, trained on the light emerging from the gratings and the slit, has an output (ideally sinusoidal in waveform) which fluctuates according to the movement of the bands.

The pitch of the rulings on the diffraction gratings 55 and 56 may be of the same order of magnitude as the limits of accuracy to which the machine is to be controlled. A movement of the work table equal to the distance between two adjacent rulings produces a movement of the bands (or moiré fringes) such that one band occupies the place previously held by its immediate neighbour. As the bands and their spacing is many times greater than those of the grating lines the device provides a sensitive measure of work table movements, and the output of the light cell passes through one minimum and one maximum for each said movement of the work table.

Various proposals have been made for distinguishing between different directions of movement of the work table, which results in different directions of movement of the bands or moiré fringes, but it is not considered necessary to describe such methods. It is sufficient to say that light cell 57 gives an output which fluctuates in time with small increments of movement of the work table of predetermined length and that the direction of movement can be distinguished. If the command signals from pick-up 53 are in the form of signal elements each representing one of the said small increments of movement of the work table and having one form for one direction of movement and another form for the opposite direction of movement, the two inputs into comparator 54 can be compared and any difference can be arranged to represent the discrepancy at any instant between the movements required of the work table and the movement actually made good. This difference or error signal derived from fluctuating indications, will be in incremental or digital form. To apply such an error signal to valve 33 a digital-to-analogue converter 58 is interposed between the comparator 54 and the valve actuator 59. The analogue signal applied to actuator 59 may be a voltage corresponding to the number of units of error held in comparator 54 at any instant.

Such a voltage applied to valve actuator 59 will operate valve 33 to cause relative movement between piston 27 and the cylinder of unit 17 and as the piston is held by the rack, the cylinder will move and with it the table. If the command signals from pick-up 53 call for continuous movement of work table 4 there will be a continuous error signal in 54 since, as soon as a cancelling signal is received from light cell 57 to cancel one command signal, the error is registered again on receipt of a new command signal. As the piston moves from its central position in the cylinder slider 61 of rheostat 60 moves from the neutral central position and motor 9 starts up. The worm and rack 10, 11 then drive the work table in the same direction as it is already being driven by piston 27 and the two superimposed motions cause a momentary excess of signals from light cell 57 which result in signals of reversed sense being passed from comparator 54. The result is that the valve 33 is operated in the reverse sense to move piston 27 back towards its central position. The motor, worm, rack combination 9, 10, 11 must be capable of centering piston 27 even in the presence of continued command signals in the same sense. The system must therefore be arranged so that the maximum speed of the motor, worm, rack combination exceeds the maximum speed required of the work table. The "law" of rheostat 60 must therefore be such that the work table will soon be moving faster than the speed called for by the command signals which will result in reverse signals from comparator 54 and compensatory movement of the piston 27 towards its central position. The motor 9 will be progressively de-energised as this position is approached by piston 27 but will continue to revolve by inertia for some little time after the central position is reached so that the piston may, in compensating for any continued excess speed of the work table, overshoot its central position and operate rheostat 60 in the reverse sense so as to reverse the motor. In practice there may be some slight hunting as between the piston and the motor. This will not matter in many cases since the sensitivity of the hydraulic piston and cylinder assembly 17 to signals received via valve actuator 59 will be sufficient to correct momentary discrepancies between the actual and the required movements of the work table within acceptable limits of accuracy.

Figure 8:
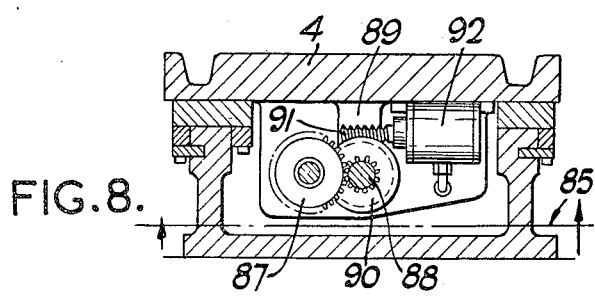
Figure 8 is a cross sectional side elevation of the said second embodiment.
Figure 9:
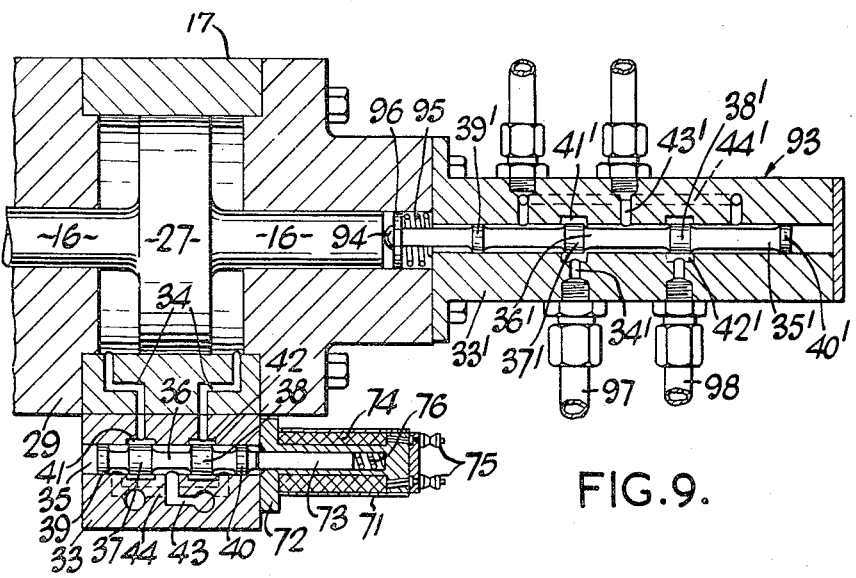
Figure 9 is a cross section to an enlarged scale of a part of the said second embodiment.

A second embodiment of the invention, again applicable to a vertical spindle milling machine similar to that shown in Figure 1 is illustrated in Figures 7, 8 and 9.

Figure 7 is an underside view of the work table, slideways, etc., horizontally sectioned at a point just above the base of the structure supporting the slideway, that is to say along the line 85 in Figure 8.

Figure 8 shows a cross-section of the work table and slideways sectioned along the line 86 in Figure 7 looking in the direction of the arrows.

Figure 9 shows the details of the quick drive.

In these figures the same reference numerals as have already been used in relation to the preceding embodiment of the invention will be used, where applicable, for corresponding items.

In the construction shown in Figures 7, 8 and 9 the piston and cylinder unit 17 is of the double acting type and the piston rod 16 extends on both sides of piston 27 and projects into cylinder end 31 as well as passing through cylinder end 29. The effective area of piston 27 is therefore the same on both sides.

Valve 33 as shown in Figure 9 is of the same basic construction as valve 33 in Figure 4 but its ports are differently connected to serve the double acting cylinder. Thus the annular ports 41 and 42 lead to the cylinder at the left hand and right hand sides of piston 27 respectively. The port 43 communicating with the high pressure side of the hydraulic pressure supply system, enters the valve bore 35 between the controlling lands 37 and 38, and the port 44 communicating with the low pressure side of the hydraulic pressure supply system, is branched and communicates with bore 35 between lands 37 and 39 and lands 38 and 40 respectively. Displacement of the spool 36 to the left places the left hand end of the cylinder into communication with the high pressure pipe and the right hand end of the cylinder into communication with the low pressure pipe so that piston 27 is urged to the right, and vice versa when spool 36 is moved to the right.

Figure 9 shows a valve actuator 71 having a body 72 in the form of a bobbin, fixed to the end of valve 33, and having a central bore in which rides an armature bar 73 fixed to the end of spool 36. Bobbin 72 carries a winding 74 connected to terminals 75. The end of the bore of bobbin 72 holds a spring 76 bearing on the end of armature 73 and urging it to the left. Currents passing through winding 74 attract the armature 73 and draw it, together with spool 36, to the right. A standing bias current is applied to winding 74 to hold spool 36 central against spring 76. Command signals are of a type such as to oppose or assist the standing bias whereby spool 36 can be moved to the left or the right respectively.

In a more sophisticated arrangement a second actuator similar to 74 is attached to the other end of valve 33, the two springs 76 being balanced to hold the spool 36 central in the absence of currents in the actuator windings. The command signals are applied to one or the other of these twin actuators according to the direction of movement required. The standing bias may then be dispensed with.

The hydraulic cylinder piston and cylinder unit 17 is supported by a bracket 70 integral with and projecting downwardly from the right hand end of work table 4. The piston 27 of the quick drive is fast with a lead screw 66, the end portion of which forms piston rod 16. The piston 27 must therefore be capable of rotation in its cylinder. For this purpose the piston must have sufficient clearance in the cylinder to avoid excessive rotational friction. This presents no difficulty where the lead screw can be relied upon to run true. If, however, there is any risk of the lead screw being slightly bent, or developing whirl, a rotatable coupling must be interposed between the lead screw and piston rod 16. This coupling should be free from backlash as far as possible. Lead screw 66 rotates in a nut 69 secured to the base of the slideway supporting structure. A gear wheel 87 is fixed to lead screw 66 at its end nearest to the quick drive piston and cylinder unit 17 and this gear wheel is in mesh with an elongated pinion 88 and journalled for rotation in bearings 89 projecting downwardly from the side of the work table. Fast with pinion 88 is a worm wheel 90 which is meshed with a worm 91 driven by a rotary hydraulic motor 92. Motor, worm wheel, pinion, gear, lead screw and nut combination, 92, 91, 90, 88, 87, 66 and 69 constitute the slow drive. Endwise movement of gear wheel 87 under the action of the quick drive is accommodated by the teeth of gear wheel 87 sliding along the teeth of the elongated pinion 88. A hydraulic valve 93 is fixed to the right-hand end of cylinder end 31. The valve 93 is of the same type as the valve 33 and has been given the same reference numerals primed. In valve 93, however, the spool 36' has been elongated since it is actuated by movements of piston 27 and must be capable of correspondingly larger excursions to the left and the right than is required in the case of valve 33. The left-hand end of spool 36' terminates in a ball end 94 which is urged leftwards against the end of piston rod 16 by a compression spring 95 bearing at one end against the end face of the valve body 33' and at the other end against a flange 96 integral with spool 36'. Output pipes 97 and 98 lead to the rotary hydraulic motor 92. When piston 27, and with it spool 36', moves to the left relative to the cylinder and the high pressure side of the hydraulic supply system is in communication via port 43', port 41' and port 34' with the pipe 97, and the low pressure side of the hydraulic supply system is in communication via port 44' and port 42' with the pipe 98. This causes the rotation of motor 92 in such a sense as to propel the work table 4 in the same direction as it is being propelled by cylinder 25 (that is to say to the right). When piston 27 moves to the right the connections between the high pressure and low pressure sides of the hydraulic supply system and the pipes 97 and 98 are reversed so that motor 92 is caused to rotate in the reverse direction.

With this arrangement the driving velocity of the slow drive is a function of the displacement of piston 27 in a manner analogous to that described in connection with Figure 6, with the advantage over the arrangement of Figure 6 that in general a rotary hydraulic motor has less inertia to be overcome and can therefore follow more truly the movements of piston 27 in a proportional manner.

In all embodiments of the invention it is preferable that the complete chain of linkages from one to the other of the two objects between which relative movement is required, should be free from backlash and elasticity since any lost motion due to these factors constitutes an absolute limit to the accuracy with which the driving mechanisms can control the relative movements between the two objects. It is nevertheless permissible to have a certain amount of backlash and elasticity present in such linkages (indeed it is scarcely possible to eliminate them entirely in practice) so long as the total lost motion remains substantially below the limits of accuracy with which the relative motion between the two objects is to be controlled.

The slow drive should preferably be irreversible in the sense that it cannot yield under loads imposed upon it by the driving action of the quick drive.

A certain amount of reversibility is permissible however so long as such reversibility operates at an extremely low mechanical advantage and so long as it involves the acceleration of some element of substantial mass. This may be illustrated in connection with the embodiment of the invention shown in Figures 1, 2, 3 and 4. Whereas the worm 10 can be rotated by motor 9 to propel rack 11, an endwise thrust on the rack 11 cannot cause the worm 10 to revolve to any significant extent because the angles of the mating teeth are such as to provide an overwhelming mechanical disadvantage to such reversed movement. If the mating teeth were cut at a more oblique angle, however, the worm 10 might be capable of turning in the presence of high endwise thrusts imparted to rack 11 by the quick drive 17. This would not seriously impair the operation of the machine, however, so long as the worm or elements rigidly coupled to it had high inertia so as to retard any reversed motion of the rack 11. Suppose, for instance, that the quick drive is acting under command signals calling for movement of the work table 4 to the right as seen in Figure 1. If worm 10 were slowly to start turning in response to the end thrust on rack 11, then the rightwards movement of work table 4 would slowly fall behind the rate of movement called for by the command signals. This would produce (in a monitoring feedback system such as that illustrated in Figure 5) a slowly rising deficit of signals from the monitoring equipment (i.e. from light cell 57) as against the incoming command signals (i.e. from reading head 53). In response to this deficit, quick drive 17 would increase the speed of its driving action to the right and energise motor 9. Even if motor 9 took some time to reach full speed, it would develop enough torque to arrest the rotation of worm 10 earlier than this and in any event the acceleration of worm 10 due to relatively high inertia would be slow enough to give motor 9 time to reverse the movement of piston 27 before it reached the end of its stroke. Without this inertia worm 10 might yield so quickly that the quick drive could exhaust its stroke before motor 9 had picked up sufficiently to come to the assistance of the quick drive.

Various re-arrangements of the quick drive and the slow drive which are kinematically equivalent to the arrangement in the two embodiments described above, are within the scope of the invention and indeed the relative motion between the two objects may be a rotary movement rather than a linear movement.

Figure 10:
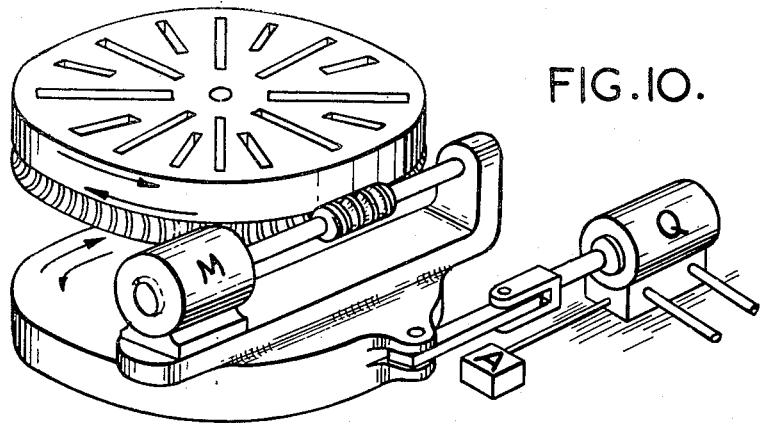
Figure 10 is a diagrammatic representation of a rotary version of the invention.

Figure 10 illustrates, schematically, a rotary arrangement in which a work table journalled for rotation in bearings (not shown) is driven by a slow drive in the form of a worm wheel coupled to the work table (shown as machined from the underside of the rim of the work table). This worm wheel co-operates with a worm driven by the motor M of the slow drive which are mounted on a subtable which is also journalled, for rotation co-axial with the work table, in bearings (not shown). The quick drive Q is anchored to fixed parts of the machine and can rotate the subtable carrying motor M to and fro over a limited angle by means of a connecting rod.

We claim:

1. Apparatus for driving a first object along a predetermined path in relation to a second object comprising two driving mechanisms coupled together and to the first object and the second object in such a manner that movements of the first object relative to the second object along the said path are dependent upon the algebraic sum of the individual driving actions of the two driving mechanisms, the first driving mechanism being capable of a relatively high driving acceleration over only a relatively short range of driving action and the second driving mechanism being capable of a relatively long range of driving action but being arranged to provide only a relatively low driving acceleration, means, responsive to a signal representing the motion required of the first object in relation to the second object along the said path, for actuating the first driving mechanism and means for controlling the second driving mechanism such means having two co-operating members one coupled to one part and the other coupled to the other part of two parts of the first driving mechanism which execute relative movement to provide the driving action of the first driving mechanism, the said members co-operating to increase the driving action of the second driving mechanism as the said two parts of the first driving mechanism move way from a predetermined relative position intermediate between the relative positions occupied by such parts when the first driving mechanism is at the ends of its driving range and to reduce the driving action of the second driving mechanism as the said two parts move towards the said predetermined relative position.

2. Apparatus as claimed in claim 1 in which the second driving mechanism comprises an electric motor and in which the said co-operating members of the control means for the second driving mechanism comprise a rheostat connected to a source of electric power and a sliding contact member making contact with the resistance element of the said rheostat and connected to the said electric motor.

3. Apparatus as claimed in claim 1 in which the second driving mechanism comprises a rotary motor driven by the flow therethrough of a fluid under pressure and in which the said co-operating members of the control means for the second driving mechanism are co-operating parts of a fluid flow control valve controlling the flow of fluid through the said motor.

4. Apparatus as claimed in claim 1 in which the first driving mechanism comprises a hydraulic piston and cylinder combination and in which the said two co-operating members are linked one to the hydraulic piston and the other to the hydraulic cylinder of the first driving mechanism.

5. Apparatus as claimed in claim 1 comprising monitoring means recording the actual motion along the said path, of the first object relative to the second object, and means for modifying the said signal applied to the actuating means for the first driving mechanism in accordance with the output of the monitoring means to form a feedback servo system for the control of the first driving mechanism.

6. Apparatus for driving a first object in relation to a second object along a predetermined path, having a first driving mechanism comprising a hydraulic piston and cylinder arrangement and a second driving mechanism comprising a rotary driving motor coupled to a device for transforming rotary motion derived from the said motor, into motion in the direction of the said path, the two driving mechanisms being coupled together and to the first object and the second object so that relative movement between the two objects along the said path is dependent upon the algebraic sum of the driving actions of the two driving mechanisms, the hydraulic piston and cylinder arrangement having a short stroke and being controlled by a high performance hydraulic valve, the second driving mechanism having a range of driving action which is long in relation to the said stroke but being arranged to provide a driving aceleration which is low in relation to that of the hydraulic piston and cylinder arrangement, a closed servo loop for controlling the relative motion between the two objects in the direction of the said path comprising means for receiving signals characteristic of desired relative motion between the said objects along the said path, means for receiving signals characteristic of relative motions taking place between the said objects along the said path, means for comprising the said signals so received and continuously generating an error signal representing the difference between the said signals, an actuator for the hydraulic valve, means for continuously operating the actuator in accordance with the instantaneous value of the error signal, co-operating members coupled respectively to the piston and cylinder of the said hydraulic arrangement and arranged to energise the motor of the second driving mechanism in such a sense as to supplement the driving action of the hydraulic arrangement such means operating to energise the second driving mechanism in progressively increasing degree as the piston approaches an end of its stroke within the cylinder and progressively to decrease the degree of energisation of the second driving mechanism as the said piston recedes from an end of its stroke within the cylinder towards zero energisation at a predetermined mid point of the stroke of the piston in the cylinder.

7. Apparatus for imparting to a first object a movement along a predetermined path in relation to a second object in dependence on a control signal representing at any given moment the required motional condition of the first object relative to the second object at that moment, such apparatus including two driving mechanisms, one having a comparatively short range of driving movement about an intermediate datum position but being arranged to provide a comparatively rapid response and the other having a comparatively long range of driving movement but being arranged to provide a comparatively slow response, said mechanisms being coupled together and to said objects for said movement to be produced by the combined driving movements of the mechanisms, a measuring device for deriving a measurement signal representing the actual motional condition of the first object relative to the second object at said moment, a discriminator for deriving an error signal of appropriate sense in response to any difference between said control signal and said measurement signal, connections for applying said error signal to operate the short-range driving mechanism, and a control stage for operating the long-range driving mechanism in continuous and proportionate response to the departure of the short-range mechanism from said datum position, such response being of sense appropriate to the sense of said departure.

References Cited in the file of this patent

UNITED STATES PATENTS

| | | |
|---|---|---|
| 2,335,079 | Patterson | Nov. 23, 1943 |
| 2,476,376 | Laraque | July 19, 1949 |
| 2,688,227 | Geyer | Sept. 7, 1954 |
| 2,796,793 | Addison et al. | June 25, 1957 |